UNITED STATES PATENT OFFICE.

CLINTON G. REED, OF PITTSBURGH, PENNSYLVANIA.

CLEANING COMPOUND.

1,266,713.  Specification of Letters Patent.  Patented May 21, 1918.

No Drawing.  Application filed July 28, 1915. Serial No. 42,383.

*To all whom it may concern:*

Be it known that I, CLINTON G. REED, a citizen of the United States, and resident of Pittsburgh, in the county of Allegheny and State of Pennsylvania, have invented certain new and useful Improvements in Cleaning Compounds, of which the following is a specification.

My invention relates to compounds used in cleaning and polishing metals, and one object of my invention is to provide a compound of novel composition whereby metals and other materials are easily and quickly cleaned and polished when rubbed with the compound.

Another object of my invention is the provision of a compound for etching glass, metals and similar materials having the etching qualities of hydrofluoric acid, which may be safely handled without liability of injury to the persons handling and applying the compound.

The invention consists broadly in a compound formed of hydrofluoric acid, barium sulfate, ammonium salts, viscous organic material, an abrasive, and water.

In the preparation of my novel compound hydrofluoric acid, barium sulfate, ammonium sulfate, ammonium fluorid, molasses, or similar viscous organic material, and flour of emery, or a similar abrasive, and water, are used preferably in the following proportions by weight:

| | Per cent. |
|---|---|
| Hydrofluoric acid | About 10 |
| Barium sulfate | " 20 |
| Ammonium sulfate | " 06 |
| Ammonium fluorid | " 15 |
| Molasses (or similar viscous material) | " 21 |
| Emery flour carborundum, (or similar abrasive) | " 06 |
| Water | " 22 |
| Total | 100 |

The proportions of the various ingredients may be varied within about the following limits:

| | Per cent. |
|---|---|
| Hydrofluoric acid | 5 to 15 |
| Barium sulfate | 15 " 25 |
| Ammonium sulfate | 4 " 8 |
| Ammonium fluorid | 10 " 20 |
| Viscous material | 15 " 25 |
| Abrasive | 2 " 10 |
| Water | 15 " 30 |

When the above ingredients are mixed in the proportions given, a viscous paste is formed which may be applied with the hands without injury to the individual.

By omitting the barium sulfate and the viscous organic material a liquid is obtained which is as effective as the paste.

In using my improved compound for cleaning and polishing, a small quantity, enough to cover the surface of the metal or other material, is applied with the hand, or a brush, or in any desired manner, and the article is then rubbed in the usual manner of polishing.

In the use of my compound for cleaning and polishing, there is the usual mechanical action due to the presence of the abrasive, and there is also a chemical action on the metal which increases or intensifies the polishing effect.

In etching with my improved compound the surface of the metal or glass to be acted upon, is covered with the compound. In a short time interval the material will be acted upon by the compound and the surfaces of the material will be frosted or etched, with the same rapidity and to the same degree as has heretofore been effected by the use of hydrofluoric acid.

The advantages of my invention, which will be apparent to those skilled in the art, arise from the combination of the chemical action of the compound due to the presence of the hydrofluoric acid and mechanical action of the abrasive. The addition of the other materials removes the dangerous qualities of the hydrofluoric acid and renders the compound safe to handle without injury to the person. The compound may be applied with the hands without injury.

Variations may be made in the materials and proportions of the materials used in forming my improved compound without departing from my invention as defined in the appended claims. The barium sulfate and the viscous material may be omitted when a liquid is desired instead of a paste. The abrasive may be omitted when the compound is to be used solely for etching, and other changes may be made.

I claim:—

1. The compound consisting of hydrofluoric acid, barium sulfate, ammonium sulfate, ammonium fluorid, viscous organic material, and water.

2. The compound consisting of hydrofluoric acid, barium sulfate, ammonium sulfate, ammonium fluorid, viscous organic material, an abrasive, and water.

3. The compound consisting of hydrofluoric acid, barium sulfate, ammonium sulfate, ammonium fluorid, molasses, an abrasive, and water.

4. The compound consisting of 10 per cent. hydrofluoric acid, 20 per cent. barium sulfate, 6 per cent. ammonium sulfate, 15 per cent. ammonium fluorid, 21 per cent. viscous organic material, 6 per cent. abrasive, and 22 per cent. water.

5. The compound consisting of 10 per cent. hydrofluoric acid, 15 to 25 per cent. barium sulfate, 6 per cent. ammonium sulfate, 15 per cent. ammonium fluorid, 21 per cent. viscous organic material, and 15 to 25 per cent. water.

6. The compound consisting of hydrofluoric acid, barium sulfate, ammonium salts, viscous organic material, and water.

7. The compound consisting of hydrofluoric acid, barium sulfate, ammonium salts, viscous organic material, an abrasive, and water.

In testimony whereof, I have hereunto set my hand.

CLINTON G. REED.

Witnesses:
R. D. LITTLE,
R. N. McELHENY.